(12) United States Patent
Ptak et al.

(10) Patent No.: US 9,943,796 B2
(45) Date of Patent: Apr. 17, 2018

(54) MULTI LAYER PLEATABLE FILTER MEDIUM

(75) Inventors: Thaddeus J. Ptak, Cana Winchester, OH (US); Chrystal B. Gillilan, Ashville, OH (US); Russell Baldinger, Laurelville, OH (US)

(73) Assignee: Columbus Industries, Inc., Ashville, OH (US)

( * ) Notice: Subject to any disclaimer, the term of this patent is extended or adjusted under 35 U.S.C. 154(b) by 0 days.

(21) Appl. No.: 12/732,817

(22) Filed: Mar. 26, 2010

(65) Prior Publication Data

US 2010/0247404 A1 Sep. 30, 2010

Related U.S. Application Data

(60) Provisional application No. 61/163,589, filed on Mar. 26, 2009.

(51) Int. Cl.
| | | |
|---|---|---|
| *B01D 46/10* | (2006.01) | |
| *B01D 46/52* | (2006.01) | |
| *B03C 3/30* | (2006.01) | |
| *B03C 3/60* | (2006.01) | |

(52) U.S. Cl.
CPC ........... *B01D 46/10* (2013.01); *B01D 46/521* (2013.01); *B03C 3/30* (2013.01); *B03C 3/60* (2013.01); *B01D 2275/10* (2013.01)

(58) Field of Classification Search
CPC .... B01D 46/523; B01D 46/10; B01D 46/521; B03C 3/60; B03C 3/30
USPC .......... 422/120, 122, 187; 96/11, 15, 17, 55
See application file for complete search history.

(56) References Cited

U.S. PATENT DOCUMENTS

| | | | | |
|---|---|---|---|---|
| 3,155,560 | A * | 11/1964 | Frohmader et al. .......... | 156/222 |
| 3,727,769 | A * | 4/1973 | Scholl ........................... | 210/484 |
| 4,093,437 | A * | 6/1978 | Ichihara et al. ............... | 55/487 |
| 4,323,374 | A * | 4/1982 | Shinagawa et al. ........... | 96/58 |
| 4,758,460 | A * | 7/1988 | Spicer et al. ................. | 428/159 |
| 4,978,372 | A * | 12/1990 | Pick ............................... | 96/67 |
| 5,419,953 | A * | 5/1995 | Chapman ....................... | 442/35 |
| 5,437,701 | A * | 8/1995 | Townsley ....................... | 55/486 |
| 5,620,545 | A | 4/1997 | Braun et al. | |
| 5,910,277 | A | 6/1999 | Ishino et al. | |
| 5,989,303 | A * | 11/1999 | Hodge ............................ | 55/486 |
| 6,156,089 | A * | 12/2000 | Stemmer et al. .............. | 55/467 |
| 6,274,041 | B1 | 8/2001 | Williamson et al. | |
| 6,336,948 | B1 * | 1/2002 | Inoue et al. .................... | 55/486 |
| 6,514,325 | B2 * | 2/2003 | Cox et al. ....................... | 96/69 |
| 6,878,177 | B2 * | 4/2005 | Lohr et al. ..................... | 55/385.2 |
| 6,926,750 | B2 * | 8/2005 | Tanaka et al. .................. | 55/486 |

(Continued)

FOREIGN PATENT DOCUMENTS

WO    WO 2006066835 A1 *  6/2006    ......... B01D 39/1692

*Primary Examiner* — Regina M Yoo
(74) *Attorney, Agent, or Firm* — Jason H. Foster; Kremblas & Foster

(57) ABSTRACT

A filter media and a pleated filter with a first layer of filtration media, a layer of support material and a second layer of filtration media on the opposite side of the support material as the first layer of filter media. All three layers are laminated together and pleated. The support material provides the required stiffness and rigidity for the pleating process. The physical characteristics of the upstream layer of filtration media are contemplated to be different than the characteristics of the downstream layer of filtration media.

23 Claims, 3 Drawing Sheets

(56) References Cited

U.S. PATENT DOCUMENTS

| | | | |
|---|---|---|---|
| 6,986,804 B2* | 1/2006 | Dominiak et al. | 95/90 |
| 7,097,694 B1* | 8/2006 | Jaroszczyk et al. | 96/17 |
| 7,311,751 B2 | 12/2007 | Mei et al. | |
| 7,691,186 B2* | 4/2010 | Wiser | 96/17 |
| 7,754,041 B2* | 7/2010 | Fox et al. | 156/181 |
| 7,951,229 B2* | 5/2011 | Ptak et al. | 96/17 |
| 8,105,425 B2* | 1/2012 | Ptak et al. | 96/17 |
| 2003/0033935 A1* | 2/2003 | Hu | B01D 39/1623 96/11 |
| 2004/0060858 A1* | 4/2004 | Lucas et al. | 210/338 |
| 2004/0074387 A1* | 4/2004 | Jaisinghani | 95/63 |
| 2007/0227359 A1* | 10/2007 | Choi | 96/11 |
| 2008/0061009 A1* | 3/2008 | Muse et al. | 210/767 |
| 2008/0148946 A1* | 6/2008 | Lotgerink-Bruinenberg | 96/55 |
| 2009/0139405 A1* | 6/2009 | Schwarz et al. | 96/17 |
| 2009/0249957 A1* | 10/2009 | Lackey, Sr. | 96/11 |
| 2009/0255404 A1* | 10/2009 | Ptak et al. | 96/11 |
| 2010/0000411 A1* | 1/2010 | Wertz et al. | 96/12 |
| 2010/0043639 A1* | 2/2010 | Fox et al. | 96/74 |

* cited by examiner

MULTI LAYER PLEATABLE FILTER MEDIUM

BACKGROUND OF THE INVENTION

Most buildings are heated, cooled and ventilated using air forced through ducts and other confined air paths. It is common to filter the air upstream of a heating or cooling mechanism in order to remove particulate and gases from the air. Removal of these contaminants reduces wear and damage to the heating and cooling mechanisms, and it improves the air quality. For example, some contaminants are poisonous or harmful to the building's occupants. Others can damage or reduce the efficiency of the heating and cooling mechanisms, such as by building up to form a layer of insulation on a heat exchanger.

Conventionally, filtration of the air is accomplished by placing a filtration media in the air path so that air forced through the air path passes through the filter media. The filter media then removes contaminants by causing the air to pass through small, tortuous paths that strain particles, by electrostatic attraction and/or by chemical reaction. The filtration media is typically placed in a frame in the side walls of the air path, and that frame keeps the media from being carried along by the moving air. The air filter, which is the combination of the frame and the media, is removably mounted in the air path of the heating, cooling and ventilation system, and is replaced once its life span has been reached.

It is known that filter media can be placed in a planar configuration across the frame so that the plane of the media is perpendicular to the direction of air flow. It is also known that the effective surface area of the filter can be increased by "pleating" the media, which is forming alternating V-shaped bends (when viewed from the end of the media). Pleating media provides an overall thicker filter than with a planar media, but the gain in effective surface area substantially improves the filter's performance.

Conventional pleated filter media can be strong enough to support itself across the filter frame. However, some media are not strong enough to be self-supporting, so that a support structure must be used to prevent the filter from "blowing out", which is where the force of the air pushes the media from its original position, possibly completely removing the media from the frame. Support structures used on pleated media include perforated material, such as aluminum, plastic, paperboard and steel. The support can be made of slit and expanded aluminum, for example, that is laminated to the downstream face of media that will be pleated and mounted in a frame.

Typically, support material for pleated media is positioned on the downstream face, which is the face of the media that encounters the air last as it flows through the filter. Downstream support for a pleated filter provides strength to the media without concern about the bonding strength of adhesives that attach the support to the media, which can be a problem with an upstream support.

BRIEF SUMMARY OF THE INVENTION

The present invention relates to a pleated filter with a first layer of filtration media, a layer of support material, such as expanded metal, plastic netting or any other stiff, perforated material, and a second layer of filtration media on the opposite side of the support material as the first layer of filter media. All three layers are laminated together, such as by using adhesives, ultrasonic welding or any other known manner of mounting filtration media to support materials. By forming such a pleated filter, the manufacturer can form pleated filters with variations in the characteristics on opposite sides of the support material.

The support material provides the required stiffness and rigidity for the pleating process, which is carried out after the support layer is laminated between the two filtration media layers. The lamination process can include cold adhesives or hot melt lamination, thermal welding, ultrasonic welding or any other type of lamination.

It is also contemplated that there can be more than one upstream layer of filtration media combined with a support layer and one downstream layer of filtration media. Alternatively it is contemplated that there can be one upstream layer of filtration media combined with a support layer and more than one downstream layer of filtration media. Still further it is contemplated that there can be more than one upstream layer of filtration media combined with a support layer and more than one downstream layer of filtration media. Thus, one or more layers of filtration media can be attached on the upstream side of the perforated support layer and combined with one or more layers of filtration media attached to the downstream side of the perforated support layer.

Any combination of characteristics of the different layers is contemplated. For example, an upstream layer is contemplated to have a lower density than a downstream layer so that large particles are retained in the upstream layer and smaller particles are retained in the downstream layer. Alternatively, the upstream layer can have a high density and the downstream layer can have an electrostatic charge to restrain charged particles that pass through the first layer and the support layer. Still further, an upstream layer can have an electrostatic charge and a downstream layer can have activated carbon that reacts with chemicals in the air to remove the chemicals.

BRIEF DESCRIPTION OF THE SEVERAL VIEWS OF THE DRAWINGS

FIG. 1 is a schematic exploded view illustrating an embodiment of the present invention.

FIG. 2 is a schematic exploded view illustrating another embodiment of the present invention.

FIG. 3 is a schematic exploded view illustrating another embodiment of the present invention.

FIG. 4 is a schematic exploded view illustrating another embodiment of the present invention.

FIG. 5 is a schematic side view illustrating the embodiment of FIG. 1.

FIG. 6 is a schematic side view illustrating the embodiment of FIG. 2.

FIG. 7 is a schematic side view illustrating the embodiment of FIG. 3.

FIG. 8 is a schematic side view illustrating the embodiment of FIG. 4.

FIG. 9 is a schematic side view illustrating the embodiment of FIG. 1 in a pleated configuration.

FIG. 10 is a schematic side view in section illustrating an embodiment of the inventive pleated filtration media in a frame.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 1:
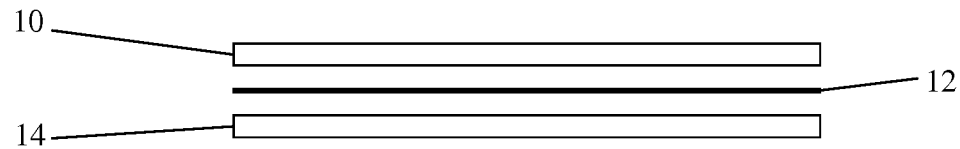

U.S. Provisional Application No. 61/163,589 filed Mar. 26, 2009 is incorporated in this application by reference. One embodiment of the invention is shown in FIG. 1 in which a first layer 10 of filtration media is disposed on the upstream side of a support layer 12. A second layer 14 of filtration media is disposed on the downstream side of the support layer 12. These layers are laminated together as described below in association with the description of FIGS. 5 through 8.

Any conventional particulate and vapor filtration media can be used to form the layers 10 and 14. Thus, filtration media includes, but is not limited to, slit and expanded paper, non-woven glass fibers and non-woven polymer fibers made by melt blowing, air or wet laying and spin bonding. Furthermore, the media can be further treated, such as by electrostatically charging the media, placing activated carbon or zeolite particles in the media to absorb or adsorb chemical vapors, one side of the media can be treated with titanium dioxide or a photocatalytic material can be used to treat the media. Of course, other treatments of the media can be carried out in order to have effects known by the person of ordinary skill.

Figure 2:
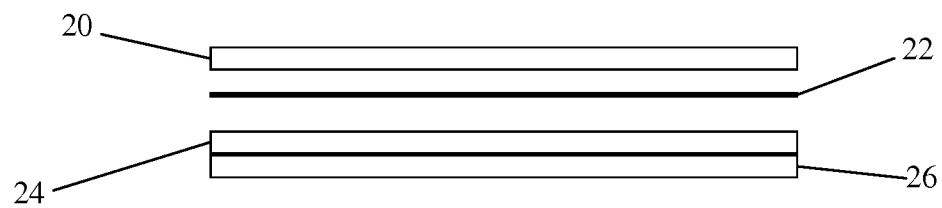

As shown in FIG. 2, it is contemplated that more than one filtration media layer can be used on the downstream side of a support layer. A first layer 20 of filtration media is disposed on the upstream side of a support layer 22. A second layer 24 of filtration media is disposed on the downstream side of the support layer 22, and a third layer 26 of filtration media is disposed on the downstream side of the second layer 24. These layers are laminated together as described below. Each layer of filtration media can be selected from one of the above-listed media or any conventional filtration media, and can be combined with various other types of media to obtain the desired result.

Figure 3:
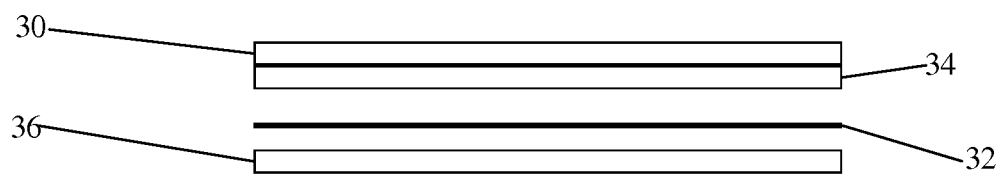

As shown in FIG. 3, it is contemplated that more than one layer can be used on the upstream side of a support layer. A first layer 30 of filtration media is disposed on the upstream side of a support layer 32. A second layer 34 of filtration media is disposed on the downstream side of the first layer 30 and on the upstream side of the support layer 32. A third layer 36 of filtration media is disposed on the downstream side of the support layer 32. These layers are laminated together as described below.

Figure 4:
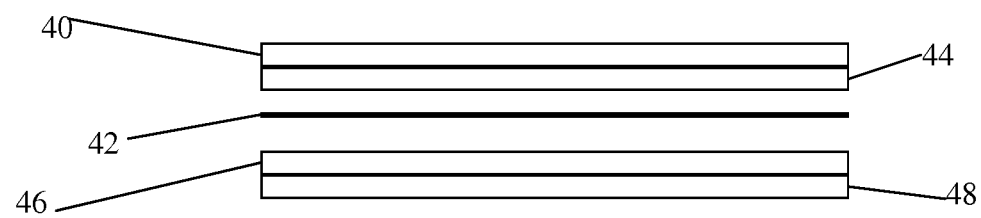

As shown in FIG. 4, it is contemplated that more than one layer can be used on both the upstream and the downstream sides of a support layer. A first layer 40 of filtration media is disposed on the upstream side of a support layer 42. A second layer 44 of filtration media is disposed on the downstream side of the first layer 40 and on the upstream side of the support layer 32. A third layer 46 of filtration media is disposed on the downstream side of the support layer 42, and a fourth layer 48 of filtration media is disposed on the downstream side of the third layer 46. These layers are laminated together as described below.

The embodiment shown in FIG. 1 is laminated together to form a unitary filter media that can be pleated using a conventional pleating process. The lamination process used is conventional and involves placing facing surfaces in contact with one another after placing an adhesive or other material therebetween and then causing or permitting the adhesive to adhere the two surfaces to one another. For example, the first layer 10 of FIG. 1 can be coated on the surface facing the support layer 12 with a hot melt adhesive. After the two layers contact one another, the hot melt adhesive will cool and harden, thereby adhering the two layers together. The same method can be used to adhere the second layer 14 to the downstream face of the support layer 12 to form the media structure shown in FIG. 5. Alternatively, a film adhesive can be placed between the layers and then acted upon, to bond the layers together, such as by ultrasonic waves, heat or ultraviolet light. Still further, if one or more of the filtration media layers are polymer, they can be welded to one another.

Figure 5:
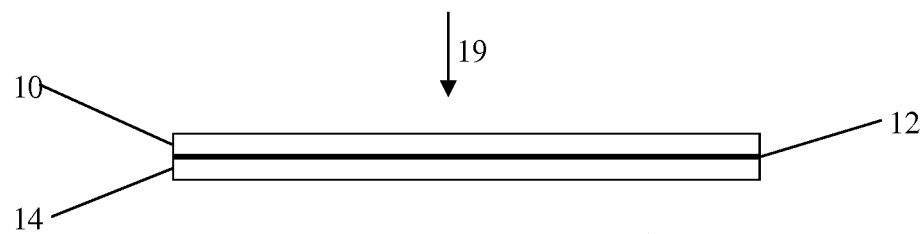
Figure 9:
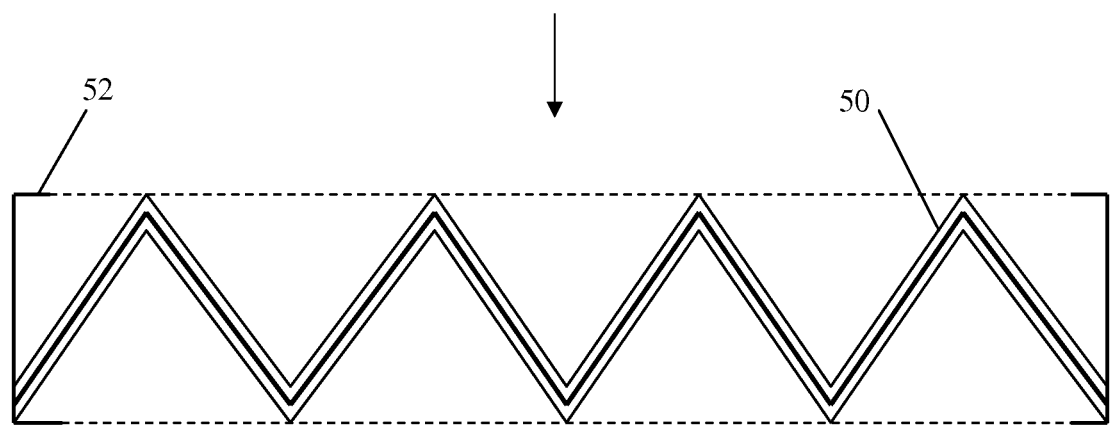

The arrow 19 of FIG. 5 shows the direction of air flow through the media structure. Of course, the media structure of FIG. 5 is preferably pleated before air is forced through it, for example to form the filtration media shown in FIG. 9, which illustrates the media 50 of FIG. 5 pleated and inserted into a frame 52.

The filtration media layers on the upstream and downstream sides of the support layer can be laminated together and to the support layer using adhesives such as cold glue or hot melt. Current lamination technology, which is designed to laminate one layer of media to one side of a support layer, must be modified to allow for lamination of two layers on opposing faces of a support layer, such as a support layer made of expanded metal. When plastic netting is used as the support layer, other lamination techniques can be utilized such as thermal bonding or ultrasonic bonding.

The support layer preferably exhibits low resistance to airflow passing through the media while providing the stiffness needed to retain a shape after deformation of the filtration media to form pleats therein. The support layer material can be slit and expanded metal, netting or any conventional open support material. The support layer can be a bi-component netting in which one set of strands is made of one material and another set of strands is made of another material (e.g., one set is made of polyester and the other set is made of polyethylene).

The preferred thickness of plastic netting, such as PET, nylon or other polymers, used as a support layer is between about 0.010 inches and about 0.100 inches and more preferably between about 0.020 inches and about 0.040 inches. The preferred thickness of an expanded metal support layer, which can be made of steel or aluminum, is between about 0.004 inches and about 0.015 inches and more preferably between about 0.006 inches and about 0.010 inches.

Figure 6:
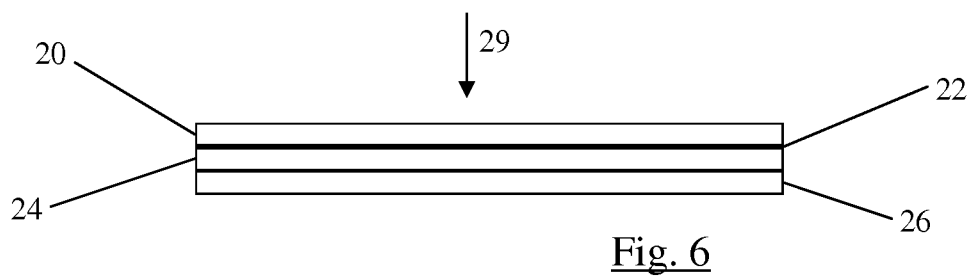
Figure 7:
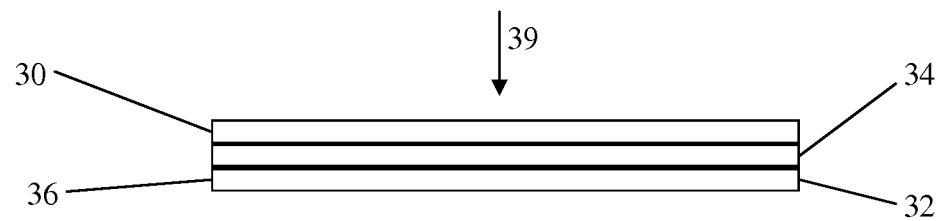
Figure 8:
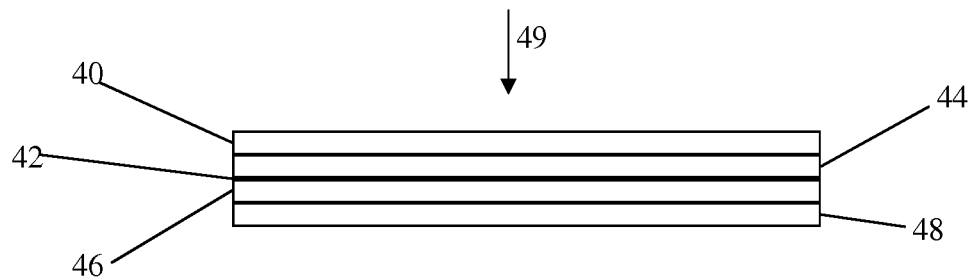
Figure 10:
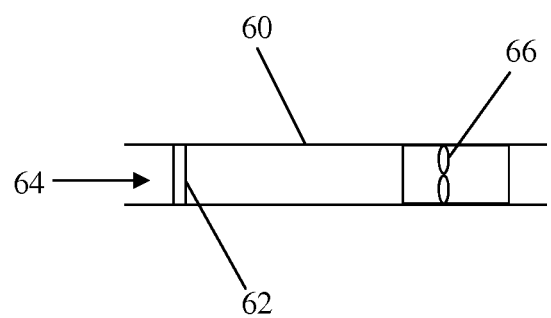

The layers of the embodiments shown in FIGS. 6, 7 and 8 are laminated together in a manner similar to the FIG. 5 embodiment, and then are pleated before they are placed in a frame in a HVAC system in which air flows through these embodiments in the directions of the arrows 29, 39 and 49, respectively. In FIG. 10, such an embodiment is shown with a duct 60 having the filter 62 mounted therein so that a fan 66 impels air in the direction of the arrow 64.

Although only four embodiments of the invention are illustrated in FIGS. 1 through 8, other embodiments are contemplated. For example, more than two layers of filtration media can be disposed and laminated on the upstream side of the support layer, and more than two layers of filtration media can be disposed and laminated on the downstream side of the support layer.

The present invention provides a filter manufacturer with a greater degree of freedom in selecting media for a given filter application, such as by combining media from different suppliers. Currently manufacturers are limited in their designs of composite filters, because if they purchase multiple layered media, they have to accept the media as it comes and generally they cannot alter its properties. With the present invention, a manufacturer can design a composite filter to fit virtually any application, because it can purchase filter media with specific performance characteristics and, because the manufacturer attaches the media to the support layer, it can modify the media prior to attaching to the support layer and other filtration media layers.

Upstream and downstream layers can be made of different materials or the same materials with different treatments. For example, synthetic nonwoven materials (wet laid, dry laid, meltblown, spunbond), cellulose and glass fiber paper and metal fibers with a different function are all contemplated. As an example, an upstream layer can be made of a material to provide filtration against particulate matter, and it can also be electrostatically enhanced. Alternatively, the upstream layer can be a membrane or wetlaid paper.

A downstream layer can be made of a more efficient filtration material than the upstream layer to create a gradient density filter material with increased dust-holding capacity. The downstream layer can also have a different function than the upstream layer, such as odor and VOC removal (gas phase filtration), antimicrobial properties (treated with anti-microbial agents) and/or photocatalytic properties (treated with catalyst such as TiO2).

For example, one upstream layer can be made of thicker material with a more open structure and a downstream layer can be made of a thinner material that is more dense. The upstream layer can be treated to have adsorption properties based on activated carbon, zeolite or a material treated with an antimicrobial agent. A downstream and/or an upstream layer can be made of electrostatically enhanced materials or filter media based on mechanical filtration such as glass fibers or nanofibers.

The technology of the present invention can be utilized in residential and commercial heating, ventilation and air conditioning (HVAC) applications, and it can be used in portable air cleaners. The invention works with essentially any type of filtration media used for flowing a gas through, with some limitations on mass/weight and thickness of the material to retain the ability to be pleated.

It is preferred that the total thickness of the composite material formed in accordance with this invention (including all filtration media layers and the interposed support layer) be within a range from about 0.015 inches to about 0.500 inches and more preferably a range from about 0.025 inches to about 0.300 inches. Of course, the final thickness may vary with the requirements of the filter application.

The FIG. 5 embodiment of the present invention for residential furnace filters includes the electrostatically enhanced media layer 10 laminated to the upstream face of the support layer 12 and the activated carbon coated media layer 14 laminated to the downstream face of the support layer 12. Another contemplated embodiment includes an electrostatically enhanced filtration media layer laminated to the upstream face of a support layer and a filtration media layer that is coated with catalyst laminated to the downstream face of a support layer.

One contemplated filtration media has an upstream filtration media layer that provides particulate removal and a downstream filtration media layer that removes a gas phase, including a catalyst and an antimicrobial agent.

It should be noted that the filtration media layers and the support layer of each filter have lateral edges that define the outer boundaries of the respective layers. When laminated together, the lateral edges of each layer of filtration media are aligned with one another in each filter. The lateral edges of the support layer are aligned on the ends of the filter, but the sides can be withdrawn slightly, such as by about one-quarter to about one-half inch, from the sides of the filtration media. This substantial alignment of all layers of each filter provides a sufficient seal where the lateral edges of the filter are fixed, such as by adhesive, in a frame. The fact that the support layer can be up to about one-half inch inside of the filtration media does not substantially alter the function of the filter.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:
1. A filtration media comprising:
(a) a first filtration media layer having an upstream face and an opposing downstream face, wherein the first filtration media layer is made of a type of material selected from the group consisting of slit and expanded paper, non-woven glass fibers and non-woven polymer fibers, which includes at least some fibers;
(b) a perforated, rigid support layer having an upstream face and an opposing downstream face, the entire upstream face of the perforated, rigid support layer laminated to the fibers of the downstream face of the first filtration media layer, wherein the perforated, rigid support layer has neither substantial filtration effect nor substantial resistance to fluid flow therethrough; and
(c) a second filtration media layer made of the type of material in the first filtration media layer, which includes at least some fibers, the second filtration media layer having an upstream face, the entire downstream face of the perforated, rigid support layer is laminated to the fibers of the upstream face of the second filtration media layer, wherein a unitary filter media is formed from a lamination of at least the first filtration media layer, the perforated, rigid support layer and the second filtration media layer;
wherein there is no additional layer separate from the unitary filter media and attached to a filter frame filtering airflow entering the unitary filter media, and there is no additional layer separate from the unitary filter media and attached to the filter frame filtering airflow exiting the unitary filter media.

2. The filtration media in accordance with claim 1, wherein the first and second filtration media layers are in a pleated configuration and the perforated, rigid support layer maintains the pleated configuration.

3. The filtration media in accordance with claim 2, wherein the first filtration media layer has physical characteristics that are different than the physical characteristics of the second filtration media layer.

4. The filtration media in accordance with claim 3, further comprising a third filtration media layer having an upstream face and an opposing downstream face, wherein the downstream face is mounted to the upstream face of the first filtration media layer.

5. The filtration media in accordance with claim 3, further comprising a third filtration media layer having an upstream face and an opposing downstream face, wherein the upstream face is mounted to the downstream face of the second filtration media layer.

6. The filtration media in accordance with claim 5, further comprising a fourth filtration media layer having an upstream face and an opposing downstream face, wherein the downstream face is mounted to the upstream face of the first filtration media layer.

7. The filtration media in accordance with claim 3, wherein the first filtration media layer is electrostatically charged, the perforated, rigid support layer is expanded metal and the second filtration media layer includes activated carbon.

8. The filtration media in accordance with claim 3, wherein the first filtration media layer is electrostatically charged, the perforated, rigid support layer is expanded metal and the second filtration media layer is coated with a catalyst.

9. A filtration media comprising:
(a) a first filtration media layer having an upstream face and an opposing downstream face, wherein the first filtration media layer is made of a type of material selected from the group consisting of slit and expanded paper, non-woven glass fibers and non-woven polymer fibers, which includes at least some fibers;
(b) a perforated, rigid support layer made of expanded metal and having an upstream face and an opposing downstream face, the entire upstream face of the perforated, rigid support layer laminated to the fibers of the downstream face of the first filtration media layer, wherein the perforated, rigid support layer has neither substantial filtration effect nor substantial resistance to fluid flow therethrough; and
(c) a second filtration media layer made of the type of material in the first filtration media layer, which includes fibers, the second filtration media layer having an upstream face, the entire downstream face of the perforated, rigid support layer is laminated to the fibers of the upstream face of the second filtration media layer, wherein a unitary filter media is formed from a lamination of at least the first filtration media layer, the perforated, rigid support layer and the second filtration media layer;
wherein there is no additional layer separate from the unitary filter media and attached to a filter frame filtering airflow entering the unitary filter media, and there is no additional layer separate from the unitary filter media and attached to the filter frame filtering airflow exiting the unitary filter media.

10. The filtration media in accordance with claim 9, wherein the perforated, rigid support layer has a thickness between about 0.004 inches and 0.015 inches.

11. The filtration media in accordance with claim 9, wherein the thickness of the filtration media is between about 0.025 inches and about 0.300 inches.

12. A filter having a filter frame in which a filtration media is mounted, the filter being configured for disposing in an enclosed air path through which air is forced, the filtration media comprising:
(a) a first filtration media layer having an upstream face, an opposing downstream face and lateral edges, wherein the first filtration media layer is made of a type of material selected from the group consisting of slit and expanded paper, non-woven glass fibers and non-woven polymer fibers, which includes at least some fibers;
(b) a perforated, rigid support layer having an upstream face, an opposing downstream face and lateral edges that are substantially aligned with the lateral edges of the first filtration media layer, the entire upstream face of the perforated, rigid support layer laminated to the fibers of the downstream face of the first filtration media layer, wherein the perforated, rigid support layer has neither substantial filtration effect nor substantial resistance to fluid flow therethrough; and
(c) a second filtration media layer made of the type of material in the first filtration media layer, which includes at least some fibers, the second filtration media layer having an upstream face, wherein the entire downstream face of the perforated, rigid support layer is laminated to the fibers of the upstream face of the second filtration media layer, wherein a unitary filter media is formed from a lamination of at least the first filtration media layer, the perforated, rigid support layer and the second filtration media layer, the second filtration media layer having lateral edges that are substantially aligned with the lateral edges of the perforated, rigid support layer, wherein the first and second filtration media layers are in a pleated configuration in the filter frame, which surrounds the aligned lateral edges of the first and second filtration media layers, and the perforated, rigid support layer maintains the pleated configuration;
wherein there is no additional layer separate from the unitary filter media and attached to the filter frame filtering airflow entering the unitary filter media, and there is no additional layer attached to the filter frame filtering airflow exiting the unitary filter media.

13. The filter in accordance with claim 12, wherein the first filtration media layer has physical characteristics that are different than the physical characteristics of the second filtration media layer.

14. The filter in accordance with claim 13, further comprising a third filtration media layer having an upstream face and an opposing downstream face, wherein the downstream face is mounted to the upstream face of the first filtration media layer.

15. The filter in accordance with claim 13, further comprising a third filtration media layer having an upstream face and an opposing downstream face, wherein the upstream face is mounted to the downstream face of the second filtration media layer.

16. The filter in accordance with claim 15, further comprising a fourth filtration media layer having an upstream face and an opposing downstream face, wherein the downstream face is mounted to the upstream face of the first filtration media layer.

17. The filter in accordance with claim 13, wherein the first filtration media layer is electrostatically charged, the perforated, rigid support layer is expanded metal and the second filtration media layer includes activated carbon.

18. The filter in accordance with claim 13, wherein the first filtration media layer is electrostatically charged, the perforated, rigid support layer is expanded metal and the second filtration media layer is coated with a catalyst.

19. A filter having a filter frame in which a filtration media is mounted, the filter being configured for disposing in an enclosed air path through which air is forced, the filter comprising:

(a) a first filtration media layer having an upstream face, an opposing downstream face and lateral edges, wherein the first filtration media layer is made of a type of material selected from the group consisting of slit and expanded paper, non-woven glass fibers and non-woven polymer fibers, which includes at least some fibers;

(b) a perforated, rigid support layer having an upstream face, an opposing downstream face and lateral edges that are substantially aligned with the lateral edges of the first filtration media layer, the entire upstream face of the perforated, rigid support layer laminated to the fibers of the downstream face of the first filtration media layer, wherein the perforated, rigid support layer has neither substantial filtration effect nor substantial resistance to fluid flow therethrough; and (c) a second filtration media layer made of the type of material in the first filtration media layer, which includes at least some fibers, the second filtration media layer having an upstream face, the entire downstream face of the perforated, rigid support layer is laminated to the fibers of the upstream face of the second filtration media layer, wherein a unitary filter media is formed from a lamination of at least the first filtration media layer, the perforated, rigid support layer and the second filtration media layer, the second filtration media layer having lateral edges that are substantially aligned with the lateral edges of the perforated, rigid support layer;

wherein the first filtration media layer, the second filtration media layer, and the perforated, rigid support layer are in a pleated configuration in the filter frame, which surrounds the aligned lateral edges thereof, and the perforated, rigid support layer maintains the pleated configuration;

wherein nothing separate from the unitary filter media and attached to the filter frame affects airflow entering the unitary filter media, and nothing separate from the unitary filter media and attached to the filter frame affects airflow exiting the unitary filter media.

20. The filter in accordance with claim 19, wherein the first filtration media layer comprises a plurality of different filtration media layers.

21. The filter in accordance with claim 20, wherein the second filtration media layer comprises a plurality of different filtration media layers.

22. The filter in accordance with claim 19, wherein the second filtration media layer comprises a plurality of different filtration media layers.

23. The filter in accordance with claim 22, wherein the first filtration media layer comprises a plurality of different filtration media layers.

* * * * *